Figure 1:
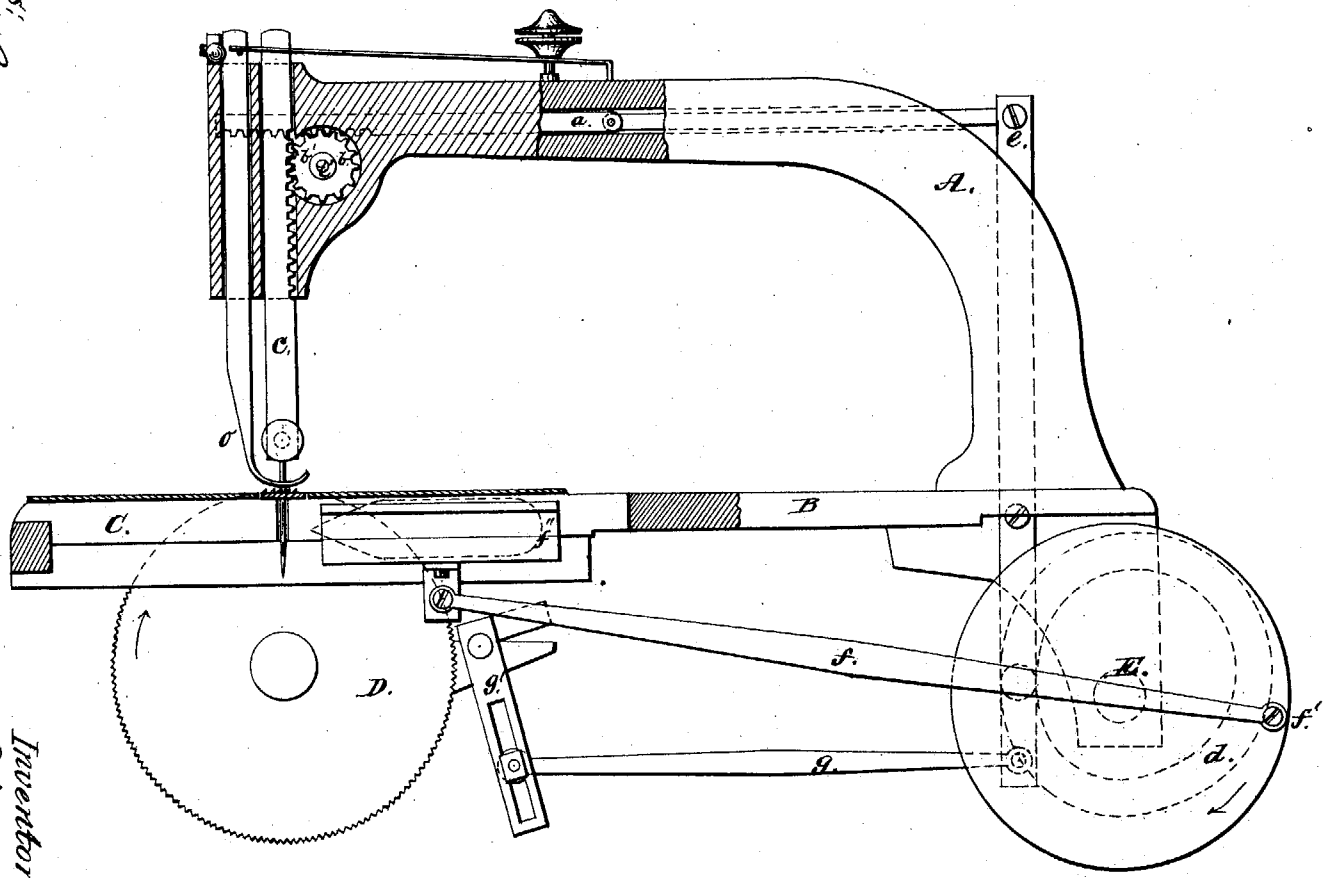

2 Sheets—Sheet 1.

W. C. HICKS.

SEWING-MACHINE.

No. 6,933. Reissued Feb. 15, 1876.

Witnesses:
W. L. Bennett
Lyman Warner

Inventor:
Wm Cleveland Hicks
By Thos S. Crow
Atty.

THE NORMS PETERS CO., PHOTO-LITHO., WASHINGTON, D. C.

2 Sheets—Sheet 2.
W. C. HICKS.
SEWING-MACHINE.
No. 6,933. Reissued Feb. 15, 1876.
Fig. 2.
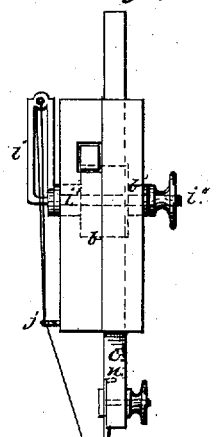
Fig. 3.
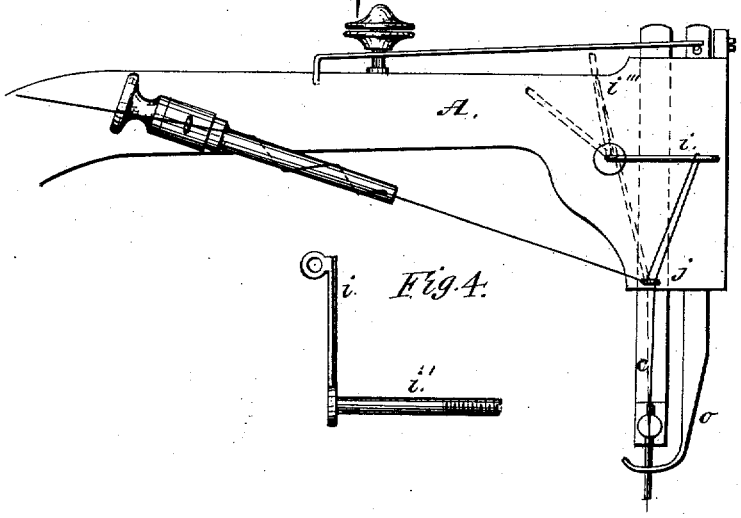
Fig. 4.
Fig. 5
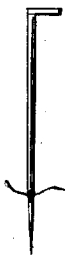
Witnesses:
W. L. Bennett
Lyman Warner
Inventor:
Wm Cleveland Hicks
By Thos P. Howe
Atty
THE NORRIS PETERS CO., PHOTO-LITHO., WASHINGTON, D. C.

UNITED STATES PATENT OFFICE.

WILLIAM C. HICKS, OF SUMMIT, NEW JERSEY.

IMPROVEMENT IN SEWING-MACHINES.

Specification forming part of Letters Patent No. 23,557, dated April 12, 1859; reissue No. 5,305, dated March 4, 1873; extended seven years; reissue No. 6,933, dated February 15, 1876; application filed July 1, 1873.

*To all whom it may concern:*

Be it known that I, WILLIAM CLEVELAND HICKS, of Summit, county of Union and State of New Jersey, (formerly of Boston, county of Suffolk and State of Massachusetts,) have made an invention of certain new and useful Improvements in Sewing-Machines; and I do hereby declare that the following, taken in connection with the annexed drawings, is a full, clear, and exact description and specification of the same.

My invention appertains to that class of sewing-machines that have a horizontal table provided with a shuttle race or way and a bracket-arm, held by its post over the table, extending parallel with the shuttle-race, to support a vertically-reciprocating needle-stock, with a shaft which drives the shuttle mounted at right angles to the shuttle-race, and connecting with the needle-driving mechanism through or near the post of the bracket-arm.

The object of my invention is to simplify, condense, and lighten the working parts of such machines, so that they may be run at greater speed, occupy less space, contain the least possible amount of metal to be moved, have less tendency to wear, and produce more uniform sewing.

I have attained these ends in the following manner: first, by placing a crank on a shaft mounted at right angles with the shuttle-race, so that said crank shall revolve under the post of the bracket-arm once for every stitch made by the machine, and giving motion to the shuttle by means of a rod operated by said crank, and connected to the shuttle-driver opposite the shuttle; secondly, by certain new combinations of mechanism for driving the needle-stock, and for controlling and drawing up the needle-thread; and, thirdly, by an arrangement of the feed-wheel, so that it may be actuated by a simple connecting-rod driven by the needle-cam, which causes the materials sewed to be fed toward the post of the bracket-arm.

The chief difficulty encountered in attempting to give great speed to shuttle sewing-machines has always been that the shuttle and its connections must receive a long and rapid reciprocating motion, which makes the labor of running said machines greater than of other classes of machines. Any arrangement by which the amount of metal to be thus reciprocated, or the force required to keep it in motion, can be reduced, tends to render such machines more capable of competing in speed with the other kinds of machines.

A machine was patented in England before my invention having a shaft mounted under the post of the bracket-arm; but it required many cams for driving the parts, and could not be arranged with a crank for driving the shuttle without an entire reconstruction of the working parts. It was a machine making two stitches for each revolution of the shaft, by the use of double cams both for driving the shuttle and needle. As the friction caused by the use of such cams for both the shuttle and needle is much greater for each stitch than when a simple crank is used for driving the shuttle, and as the weight and number of parts are in the former case much greater, such machines wear rapidly and unequally. In time it becomes also practically impossible to make perfectly uniform sewing by cam-machines making two stitches per revolution, on account of this unequal wear.

In order to use a crank for driving the shuttle, it is especially necessary that the needle should receive such a motion that it may be nearly or quite at rest during a considerable period while the shuttle is passing through the loop of needle-thread.

I have combined a crank for driving the shuttle with a cam for driving the needle, with the proper motion, in a simple and direct manner.

By my construction, also, the table and the connecting-rods may be extended and the capacity of the machine increased without materially adding to the power required to operate it. This renders the machine cheaply constructed and easily adjusted.

In order that persons skilled in the art may understand, make, and use my invention, I will proceed to describe the manner in which I apply them.

Figure I represents a side view of the machine, partly in section. Fig. II is a front view of the end of the bracket-arm and its attachments. Fig. III is a side view of same, showing the controlling device. Fig. IV is a detached view of another form of the take-up. Fig. V is the needle.

The bracket-arm which supports the needle-stock and spring-presser for the upper part of the feed is seen at A. The table for supporting the material to be sewed, and to which also all the mechanism is attached, is shown at B, the shuttle-race at C, the feed-wheel at D, and the main driving-shaft at E. The position of the bracket-arm A is in a line parallel with the shuttle-race, instead of standing at right angles to it. The feed-wheel D is placed so as to direct the cloth in a line toward the upright column or post supporting A, and into the bight of the overhanging bracket. The main or driving shaft is placed under the post of the bracket A, and under the table, at right angles with the overhanging part of the said bracket. The object of this arrangement is to enable the motions to be transmitted from the cams, cranks, &c., upon E, for driving the feed and shuttle by means of connecting-rods which shall have their motions all given them in planes parallel with the shuttle-race and bracket-arm. Thus the table B might be lengthened out to any other distance, and the feed and shuttle removed for a like distance in the same line of direction, and be operated from the main shaft by increasing the lengths of the connecting-rods. The means I have adopted for transmitting the motions to the needle-bar have the like property. The bracket-arm A is shown as being hollow. Through this a connecting-rod passes, and transmits the motions from the cam on the driving-shaft to the needle-stock. This rod is seen at *a* traversing the entire length of the arm. It moves the needle-stock by having rack-teeth cut upon its under side, as shown. These engage a pinion-wheel, *b*, and this again is engaged or geared with the needle-stock *c* by means of like rack-teeth, as shown.

The shuttle is driven by a connecting-rod, *f*, extending from the crank-pin *f'* on the main shaft to the yoke *f''*, by which the shuttle is embraced. The feed is driven by a connecting-rod, *g'*, one end of which is attached to the bottom of the lever *e*, and the other to the rocking lever *g''*, by which the griping-toe on the feed-wheel is moved.

It will now be seen that the table may be lengthened out to any required distance, and the needle, feed apparatus, and shuttle be moved according to the distant end of said table, while the driving-shaft remains at the opposite end, without requiring any new adjustment or alteration of parts other than the lengthening of the bracket-arm and the several links *a*, *f*, and *g*.

The device for controlling and drawing up the needle-thread is seen at *i* in Figs. II and III, and shown in a modified form, detached, in Fig. IV. It consists of a lever or crank having an eye in its end, through which the thread passes on its way from the tension apparatus to the needle. The axis *i'* of this crank passes through the center of the axis *b'* of the pinion *b*, and is made to turn with the pinion by means of a clamping-nut, *i''*, on the end of *i'*, which, when screwed up, sets against the end of the axis *b'*, and thus the two are joined together by friction. The object of thus attaching the two is for the purpose of adjusting the crank to its proper position for giving off and taking up the thread.

As the pinion *b* does not make a complete revolution, so the eye in the end of the crank *i* describes an arc of corresponding extent; and it is convenient to be able to adjust the end of the crank or lever containing the eye in reference to the guiding-eye *j* on the head of the bracket-arm, so that the needle-thread may be directed toward the needle, and that the tightening and loosing of the thread may be properly effected to form a strong and even seam.

At *j*, Figs. II and III, is shown this guiding-eye for the thread to pass through on its way from the tension apparatus to the controlling-crank, and thence to the needle. Thus it will be seen that the vibration of *i* toward *j* allows the thread to be slackened; so, in the reverse motion, it is taken up and tightened without passing through the needle-stock, and entirely independent of its motion.

In former machines the needle-stock has usually been either the direct agent for drawing up the needle-thread and making the slack necessary to allow the shuttle to pass through, having some attachment to control the thread between the needle-stock and the needle-eye, or the needle-stock has been the indirect agent operating an independent lever or spring-arm, through an eye in which the thread has been passed, the labor of working this lever being performed by the needle-stock. Another method has been used, which consists in operating certain wires, combined with a tension apparatus, by a shaft and cam above the sewing-table, in lines nearly parallel to the table and bracket-arm, and at a distance from the needle-stock.

My apparatus is not actuated by the needle-stock, nor does the thread pass through the needle-stock, and the eye in the end of the crank or lever is located nearly over the presser-foot, making its stroke in a plane parallel, or nearly so, with a plane passing longitudinally through the bracket-arm and shuttle-race, is pivoted to the bracket-arm at a point in the rear of the needle bar or stock, and is operated by a cam on a shaft under the table, so that the needle-stock is entirely relieved of the labor of actuating the thread-controlling mechanism. In the machine shown in the drawing, the thread must be fully drawn up before the needle has finished its upstroke, and the crank or lever is set so that the eye in its end shall be at its greatest distance from the eye

*j* when the shuttle reaches the extreme of its stroke, in order to draw the two threads into the center of the cloth, and the needle-thread is either held tight during the continued movement of the needle-stock, or is allowed to slacken. If the latter is desirable, the form shown in Fig. IV may be used. This slight slackening up is important in sewing some kinds of materials.

The operation of my machine is as follows: The materials, being placed on the fore part of the table, are advanced under the spring presser-foot *o* to the place where the sewing is to commence. This foot is then let down, to clamp the work upon the roughened surface beneath, in the usual manner. The main or driving shaft E is now started, thus communicating motion to the several parts. As the needle is at its upstroke when the cloth is inserted, the first action from the cam *d* will be to push the connecting-rod *a*. This, by its rack, turns the pinion *b*, and this again drives down the needle-stock *c*, thus sending the needle through the cloth. The thread-controller and take-up crank *i* is also turned down, and thus throws down the slack thread ready for allowing the shuttle to pass through. The respective positions of the parts will then be as shown in Fig. I. The crank-pin *f'*, from which the shuttle is driven, is seen to be on its center. As E turns in the direction of the arrow, the shuttle will commence to move forward by its connecting-rod *f* pushing the yoke *f''*. The point will thus enter the loop thrown out by the slight retreat of the needle, and then, passing through in the usual way, the needle pausing for the purpose, the cam *d* commences to draw up the needle-stock by reversing the motion of *a*. As the crank *f* approaches its opposite center, the motion of the shuttle becomes gradually slower up to the dead-point of the crank.

The cam *d* is so set and shaped as to cause the needle to begin to be moved a little before the shuttle has arrived at the end of its stroke, and to complete its movement a little after the commencement of its return. Thus there is only time allowed for drawing up the thread and returning the shuttle. The slack thread is taken up as the needle rises, and it arrives at its maximum height before the needle has completed its ascent, in order that the thread may be drawn up tight while the shuttle is at the end of its stroke, and is, for the instant, stationary.

The pinch-nut *i''* may be loosened, and the take-up *i* moved around until the adjustment is accomplished.

The shuttle being driven by a crank-motion, and the upper thread drawn up by a like motion, produces a very superior tension, and always insures the drawing up of the stitch, so that the lock will be in the center of the materials being sewed.

It will be seen that both threads are drawn up by positive motions when the shuttle and controller have their slowest motions, and just previous to their strokes being finished, and hence the threads are not liable to be broken by the highest speed at which the machine is capable of being run. The other parts of the machine are as common to sewing-machines.

Having thus fully described my invention, what I claim, and desire to secure by Letters Patent, is—

1. The combination, with a shaft mounted at right angles to the bracket-arm, having a crank at one end arranged under the bracket-post, and an irregular-grooved cam connected continuously with said crank, of a needle and shuttle, with their respective operating mechanisms, constructed and arranged substantially as described, whereby the needle remains at rest, or nearly so, while the shuttle passes through the loop of the thread carried by the needle, essentially as specified.

2. The combination, with a shaft mounted at right angles to the shuttle-race, and positively connected to the needle-driving mechanism, and having a crank arranged under the bracket-arm post, and with a shuttle-driver, of a connecting-rod adapted to be reciprocated in the direction of its length, said rod being connected to the crank and to the shuttle-driver on the side opposite to the shuttle, as described, whereby a direct and positive connection is made between the shuttle-driver and the shaft, substantially as set forth.

3. The combination, substantially as herein set forth, of a partially-revolving thread-controlling crank or lever, *i*, arranged on a stud set at right angles to the bracket-arm, above and parallel with the table, a pivoted lever, *t*, and cam *d*, placed under the table, and connecting mechanism, substantially as described, whereby the needle-thread is entirely controlled and drawn up by the movement of said cam without the intervention of the needle-stock.

4. The combination, substantially as herein set forth, of the needle-stock *e*, bracket-arm A, pinion *b*, connecting-rod *a*, having the rack for actuating the said pinion, and a pivoted lever, *t*, with the driving-shaft, having the irregular-grooved cam *d*, as described, whereby the motion of the cam may be transmitted to the pinion and needle-stock, as set forth.

5. The combination, substantially as herein set forth, with a flat table having a shuttle race or way, a bracket-arm for supporting the needle-stock, attached by its post to the table, and arranged substantially parallel to the shuttle-race, and with a shaft supported at right angles to said shuttle-race, provided with a crank and an irregular-grooved cam, of mechanisms, substantially as described, for actuating the needle and shuttle, and a wheel-feed or other feeding mechanism, arranged under the table, as described, whereby the material operated on shall be fed in a line parallel with said bracket, as specified.

6. The combination, substantially as herein set forth, of a table provided with a shuttle race or way, a bracket-arm and post arranged with respect to said shuttle race or way, as described, a shaft located under the table and post, and at right angles to the shuttle race or way, and provided with a crank and an irregular-grooved cam, a connecting-rod adapted to be reciprocated in the direction of its length, and a bar extending longitudinally through the bracket-arm to actuate the mechanism which reciprocates the needle-stock, whereby the table, the bracket-arm, and the connecting-rods or bars may be lengthened in the same direction without changing either the cam and the crank which actuates the needle-stock and shuttle, or their combined motion in reference to each other, as specified.

WILLIAM CLEVELAND HICKS.

Witnesses:
E. G. WOOLFOLK,
JOHN F. GARVEY.